United States Patent [19]

Epstein

[11] 3,848,474

[45] Nov. 19, 1974

[54] VARIABLE-SPEED, POSITIVE-DRIVE TRANSMISSION PROVIDING OUTPUT SPEEDS FROM ZERO R.P.M. UP TO FULL OUTPUT R.P.M.

[76] Inventor: Aaron Meyer Epstein, 268 Autumn Ridge Rd., Fairfield, Conn. 06604

[22] Filed: Jan. 10, 1973

[21] Appl. No.: 322,435

[52] U.S. Cl. .................................................. 74/117
[51] Int. Cl. ............................................ F16h 29/04
[58] Field of Search ........................... 74/125.5, 117

[56] References Cited
UNITED STATES PATENTS
2,983,154  5/1961  Neukirch .............................. 74/117

*Primary Examiner*—Samuel Scott
*Assistant Examiner*—Wesley S. Ratliff, Jr.

[57] ABSTRACT

A variable-speed, positive-drive transmission is described in which the output speed is variable over a continuous range from zero output speed to the maximum output speed of the transmission. The maximum output can be made equal to, greater than, or lesser than the input speed depending upon the relative sizes of a sun and intermediate gears used in the output stage. A rotatable speed control member can be turned to different angular positions to control the speed of the intermediate and sun gears. An input connection rotates eccentric drive means causing a plurality of input crank arms mounted on the speed control member to swing back and forth about swing axes to swing yoke crank arms also mounted on this speed control member. A plurality of output crank arms have swivel means slidably engaging slideways on the yoke crank arms. Changing the angular position of the rotatable speed control member slides the effective points of engagement between said swivel means and said yoke crank arms toward or away from the swing axes of said yoke crank arms, thereby decreasing or increasing the effective length of the yoke crank arms to thereby decrease or increase the extent of rocking motion of the output crank arms which are connected through over-running clutches to the intermediate gears. When the speed control member is moved to the angular position such that the swing axes of the yoke crank arms are directly aligned with the swivel axes of the swivel means, the resultant motion of the output crank arms is reduced to zero to produce zero output speed.

10 Claims, 8 Drawing Figures

VARIABLE-SPEED, POSITIVE-DRIVE TRANSMISSION PROVIDING OUTPUT SPEEDS FROM ZERO R.P.M. UP TO FULL OUTPUT R.P.M.

DESCRIPTION

The present invention relates to a variable-speed, positive-drive transmission providing output speeds from zero revolution per minute (RPM) up to full output RPM.

Among the many advantages provided by a transmission embodying the present invention are the following:

1. The transmission provides infinitely variable speed from zero RPM up to the full output RPM without requiring any disengaging of the transmission from the load.
2. The output speed can be varied while the full load is being driven by the transmission.
3. The transmission provides a positive drive delivery at all output speeds throughout its entire operating range.
4. The transmission can be used with any constant speed or variable speed power source or prime mover. That is, the input shaft of the transmission can be driven by a gasoline, Diesel, or steam engine, or by an electric motor, by a turbine, waterwheel, etc. It is possible to use manual drive on the input shaft.
5. More than one shaft of the transmission can be used as the driven output shaft, if desired.
6. The transmission can be constructed such that the maximum output RPM is less than, equal to, or greater than the input RPM, whatever may be desired for a particular application.
7. Advantageously, a transmission embodying this invention can be driven in either direction. In other words, the transmission will work regardless of whether a clockwise or counterclockwise driving power source is attached to the input shaft. The output will turn in the same direction in either case.
8. The transmission has a "dead man" effect. When the speed control is released, it tends to move to the limit of its travel. Thus, the transmission can be arranged to have a dead man action such that the output shaft drops to zero speed whenever the speed control is released. Alternatively, if the transmission's input shaft is driven oppositely to the previous case, that the output shaft goes to full speed whenever the speed control is released. This reversal of control torque can also be accomplished within the transmission by reversing the direction the crank arms are installed.

The various features and advantages of this invention will be more fully understood by reading the following detailed description, together with the accompanying drawings, in which.

In the drawings, corresponding reference numerals are used to indicate elements performing the same respective functions throughout the various figures.

Figure 1:
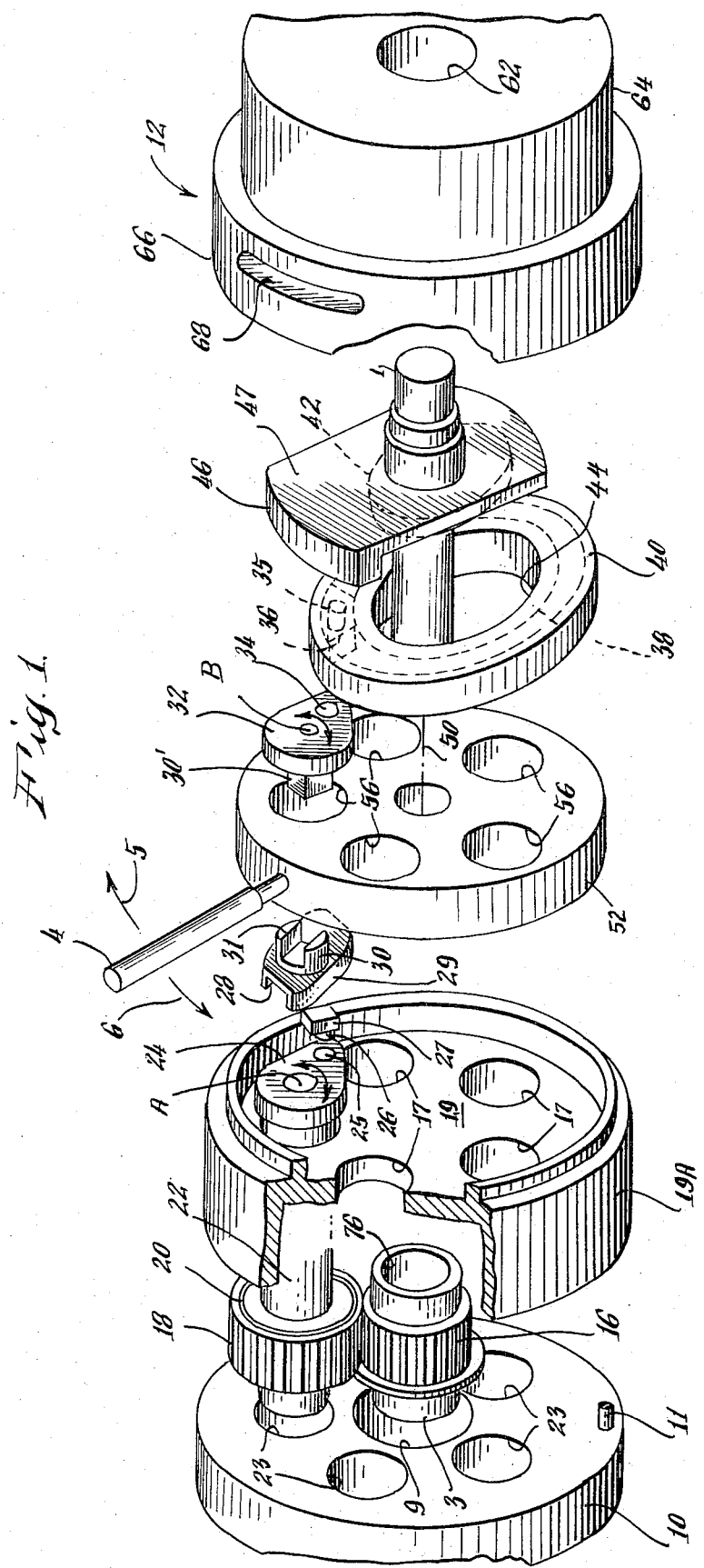
FIG. 1 is an exploded perspective view of a transmission embodying this invention, with a portion broken away to show the construction more clearly.
Figure 2:
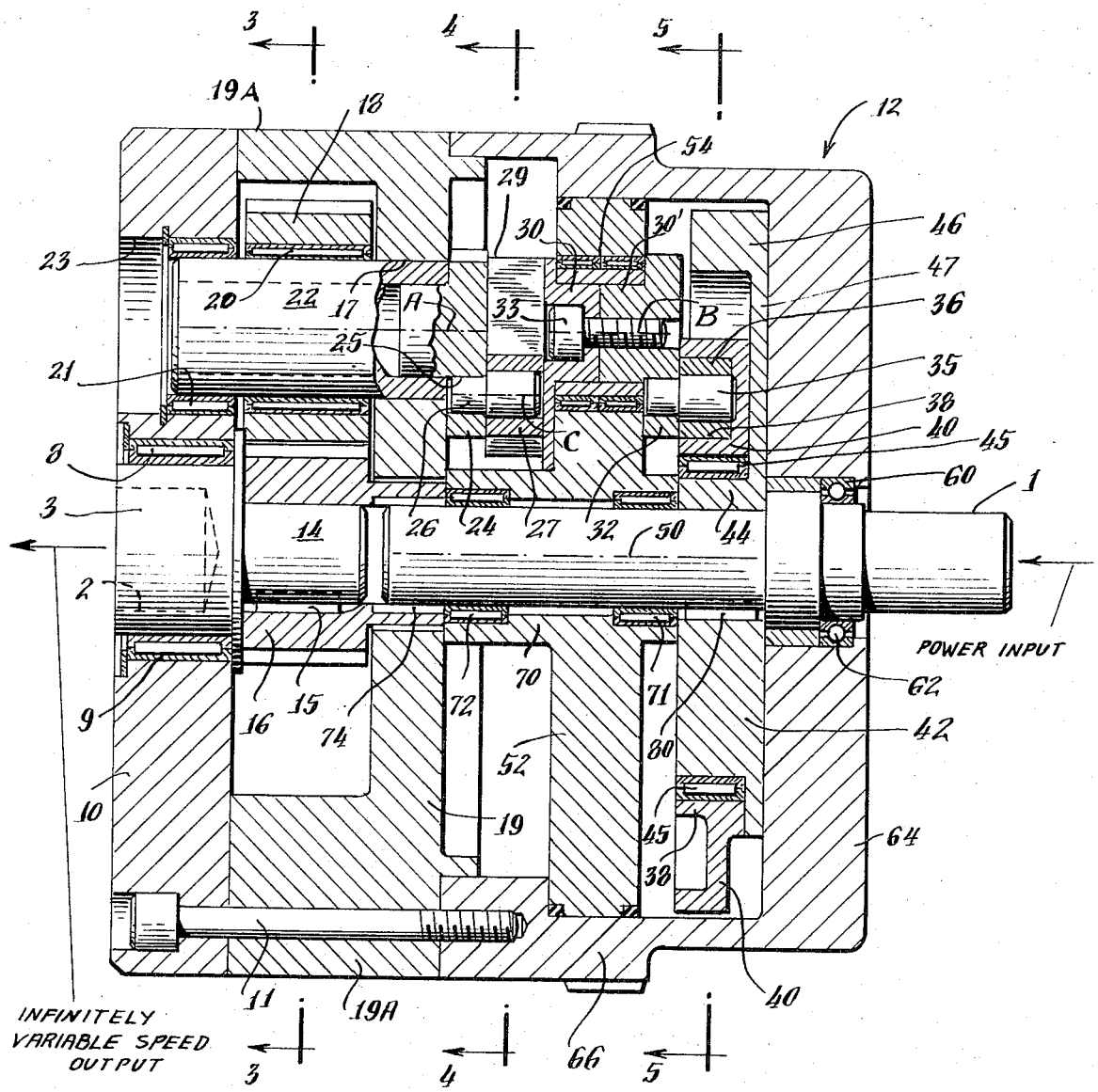
FIG. 2 is an axial sectional view of the transmission of FIG. 1.

As shown in FIGS. 1 and 2, the transmission has an input connection 1, shown as a shaft, adapted to have input power applied thereto. At the other end of the transmission, there is an output connection 2, shown as a socket in an output shaft 3, and the speed of rotation of this output connection can be varied over the range from zero RPM up to the full output RPM. The speed of the output connection 2, 3 is varied by moving a control arm 4 in the direction of the arrow 5 or 6. Moving the arm 4 in the direction 6 will increase the speed of the output shaft 3, whereas moving it in the opposite direction 5 will decrease the speed of the output shaft 3. A roller bearing 8 surrounds the output shaft 3; this roller bearing being mounted in a hole 9 in an end plate 10 of the transmission housing 12. The plate 10 and housing 12 are held together by suitable fastening means, such as machine screws 11.

In order to describe the structure and operation of the transmission, it is more convenient to start with the output shaft 3 and to follow the features of construction as the description moves toward the input shaft 1.

The output shaft 3 has an integral extension 14 rigidly connected by a key 15 to an output gear 16. This output gear 16 is a "sun" gear (See also FIG. 3) surrounded by and driven by a multiplicity of intermediate gears 18. Three or more intermediate gears 18 can be used. In this embodiment, five intermediate gears 18 are shown. For clarity of illustration, only one of the intermediate gears 18 is shown in FIGS. 1 and 2.

Within each of the intermediate gears 18, there is an over-running (one-way drive) clutch 20 mounted on a shaft 22. These shafts 22 can be made hollow to save weight, if desired. These shafts 22 are supported in bearings 21 seated in openings 23 in the output end plate 10.

Figure 3:
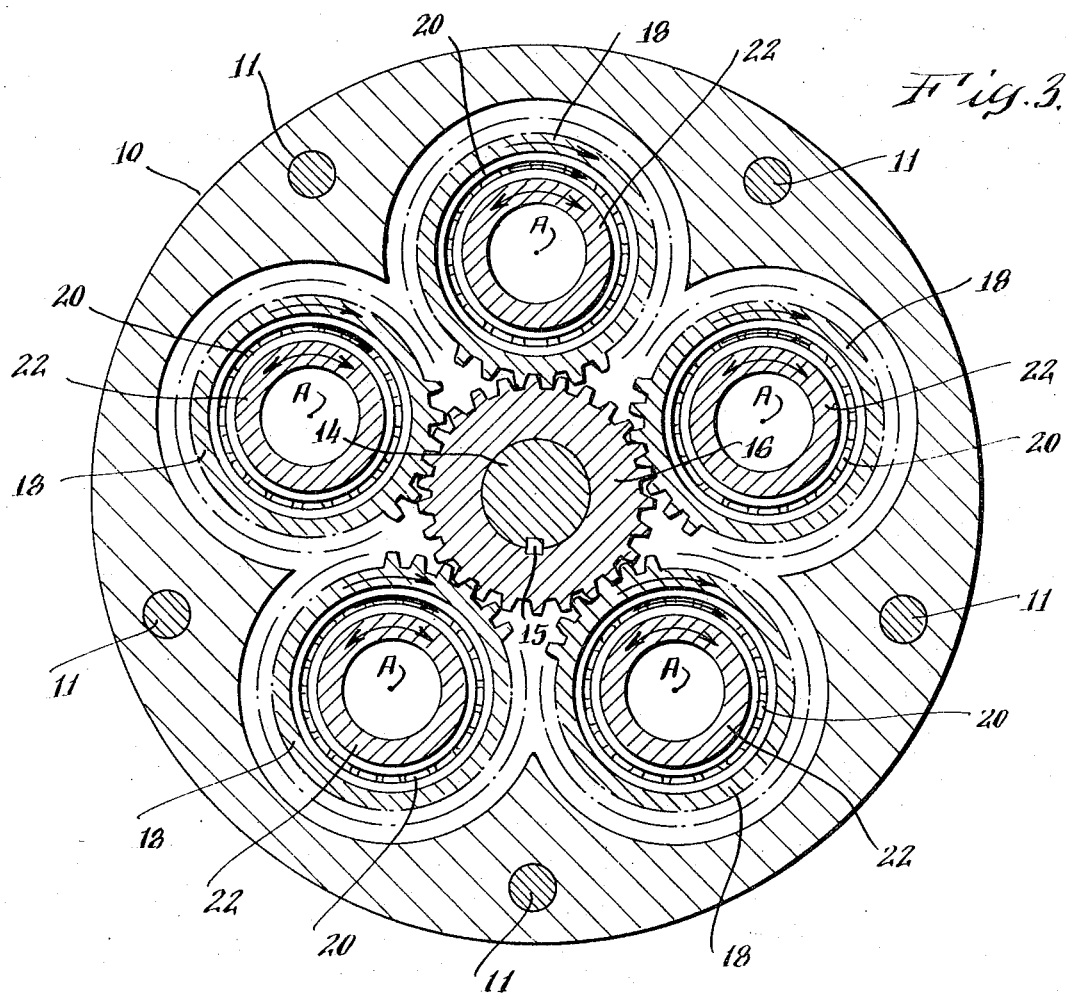
FIG. 3 is an enlarged cross-sectional view taken through the plane 3—3 in FIG. 2 looking toward the left.

In operation, when any one of the five shafts 22 is turned in a forward direction, for example, in the clockwise direction in FIG. 3, it serves to drive the associated intermediate gear 18 through the intervening over-running clutch 20, and consequently the output shaft 14, 3 is driven in a forward direction. Whenever any one of the shafts 22 is turned in a backward direction, nothing happens, because the associated over-running clutch 20 permits this backward movement without affecting the output shaft. In FIG. 3, double-headed arrows are shown on each of the shafts 22 to indicate that during operation they are turned cyclically forward and backward through only a part of one full rotation.

The single-headed arrows are shown in FIG. 3 on the over-running clutches 20 and on the intermediate gears 18 because they are only driven in the forward direction due to the action of these clutches.

The forward ends of the shafts 22 extend through bearing holes 17 in a support member 19 (FIG. 2) which forms a partition within the transmission housing 12. This member 19 includes a wide cylindrical flange 19A extending around its periphery and serving as part of the housing 12.

Figure 4:
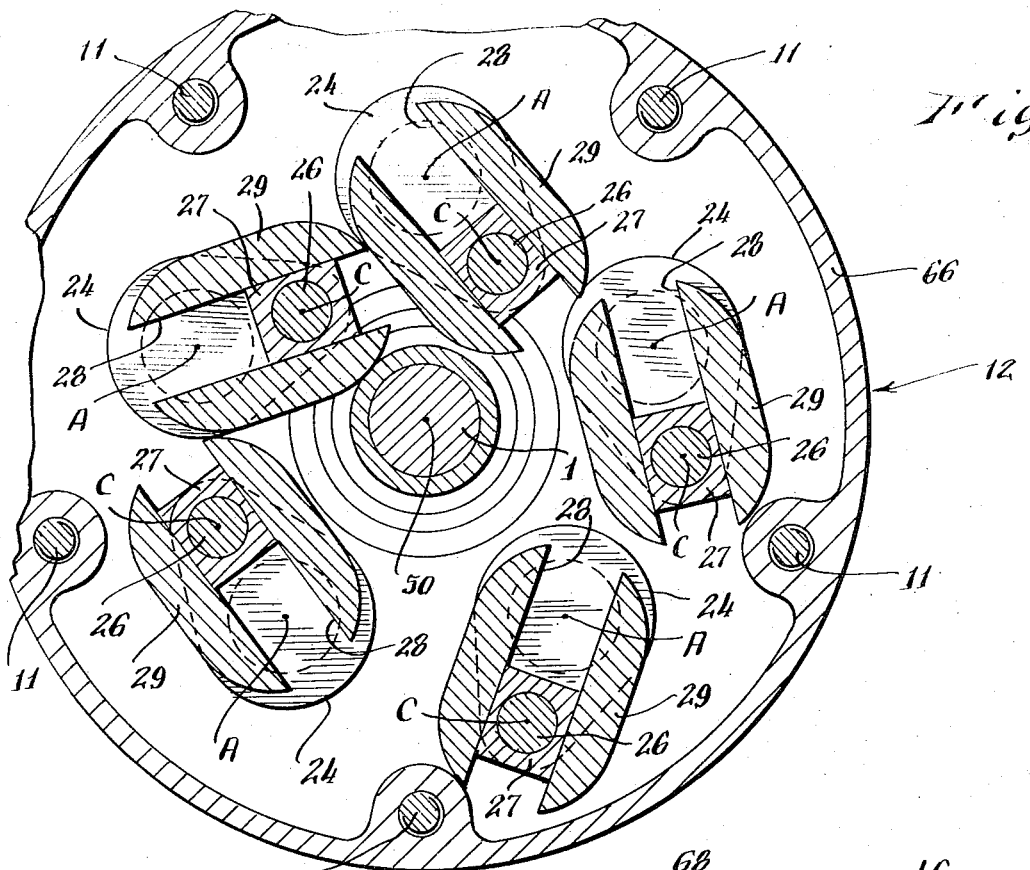
FIG. 4 is a cross-sectional view on the same scale as FIG. 3 and being taken through the plane 4—4 in FIG. 2 looking toward the left.

In order to drive each of the shafts 22, there are respective output crank arms 24 connected to each shaft (FIG. 1). At the free end of each output crank arm 24, there is a bearing socket 25, with a stub shaft 26 carrying a rectangular slide block or shoe 27, extending into this socket 25. The stub shafts 26, sockets 25 and shoes 27 form swivel means. In FIGS. 1 and 4, the reference letters A indicate the swivel axis of the respective shafts 22 and thus also indicate the axes about which the arms 24 are swung back and forth as they are driven by the slide blocks 27.

These rectangular slide blocks, or shoes 27 can also be seen in FIG. 4 which shows that they are slidably engaged in respective channels 28 of a plurality of yoke crank arms 29. The rectangular slide blocks 27 can swivel on the axis C of their stub shafts 26, and also they can slide within the channels 28 as the yoke crank arms 29 move with respect to the axes A. Each of the yoke crank arms 29 is connected by shaft couplings 30 and 30' to another crank arm 32, shown in FIG. 1. The couplings 30, 30' provide the axis B of rotation of the yoke crank arms 29. The other crank arms 32 (called input crank arms) each has a bearing socket 34 in its free end, and a stub shaft 35 carrying an arcuate slide block or shoe 36 seats in this bearing socket 34.

The reason for using the couplings 30, 30' is to provide interconnection along axes B between the yoke crank arms 29 and the input crank arms 32 which are positioned on opposite sides of a movable speed control plate 52. The connections are made through respective openings 56 (FIG. 1) in the control disc 52. Each shaft coupling 30 has a slot 31 therein, as seen in FIG. 1, and the mating couplings 30' have rectangular ends which fit into the slots 31. As shown in FIG. 2, the couplings 30' are held in the slots 31 by attachment screws 33.

Figure 5:
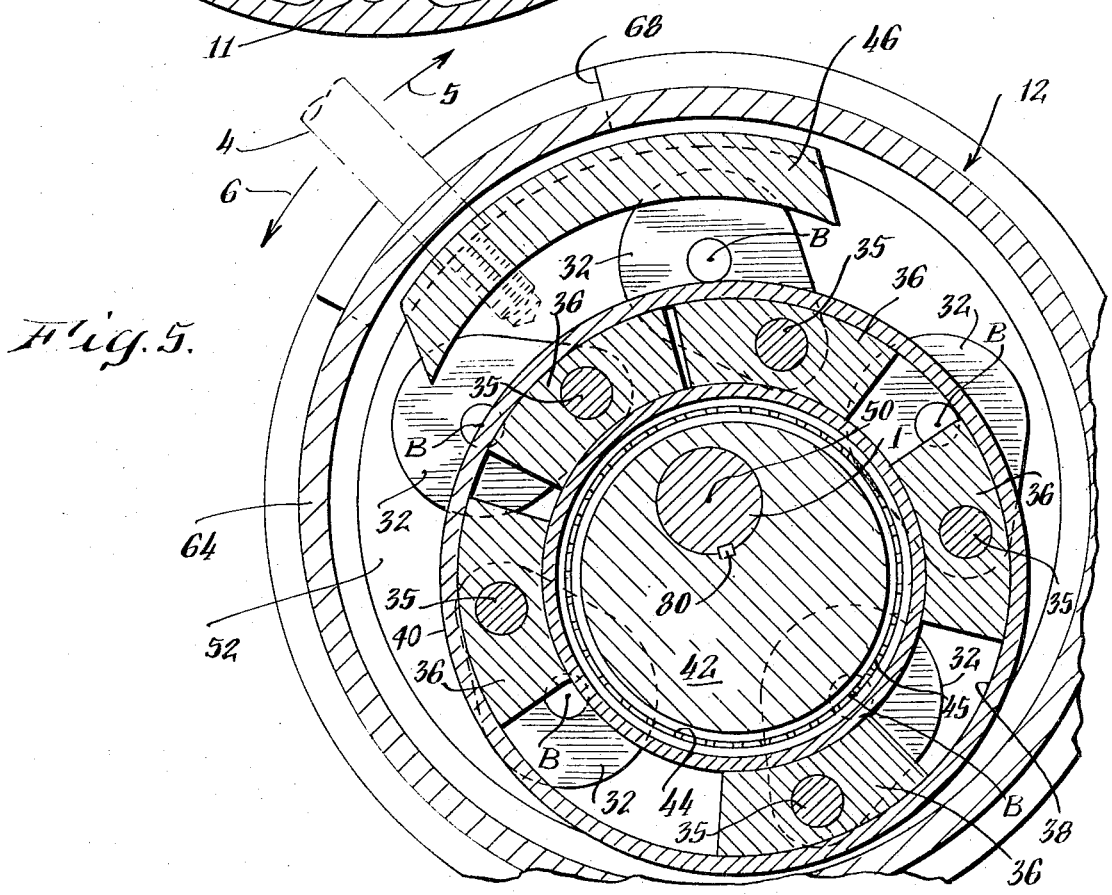
FIG. 5 is another cross-sectional view taken through the plane 5—5 in FIG. 2.

The arcuate slide blocks or shoes 36 engage in an annular channel 38 of a wobble ring 40 (see FIG. 5). An eccentric cam 42 projects into an opening 44 in the wobble ring 40. There is a roller bearing 45 positioned between the perimeter of the eccentric cam 42 and the opening 44 in the wobble ring 40. Attached to this cam 42 is a counterweight 46. The input shaft 1 is connected to a cross arm drive member 47 which is integral with the cam 42 and counterweight 46. Thus, shaft 1 rotates the eccentric cam 42 together with its arcuate counterweight 46.

In operation, the transmission works as follows: the shaft 1 turns the eccentric 42 which causes the wobble ring 40 to move in an orbital fashion. This orbital motion of the wobble ring causes the arcuate shoes 36 to slide back and forth in the annular channel 38. As a result, the crank arms 32 are caused to swing (rotate) back and forth about the respective axes B of their couplings 30, 30'.

This rotation of the couplings 30, 30' back and forth about their axes B causes the yokes 29 to swing (rotate) back and forth which, in turn, moves the slide blocks 27 back and forth. In this way, the crank arms 24 are driven by the rectangular slides 27, so as to rock back and forth about the axes A. This back and forth rocking motion of the arms 24 and of shafts 22 actuates the one-way clutches 20 to drive the intermediate gears 18 to produce rotation of the sun gear 16.

During one cycle of rotation of the input shaft 1, each of the five crank arms 24 is moved in sequence. Accordingly, the five intermediate gears 18, in sequence, serve to drive the sun gear 16. As soon as one of the over-running clutches is driving faster than the preceding clutch, the faster driving clutch takes up all of the driving load, until the next over-running clutch catches up, then this next over-running clutch takes up the entire driving load, and so forth, in sequential order.

In order to control the speed of the output shaft, the control handle 4 (FIGS. 1 and 5) is connected to the rotatable control disc 52 which can be turned back and forth to a limited extent about the main axis 50 of the transmission. The respective couplings 30, 30' are mounted in bearings 54 (FIG. 2) which are seated in openings 56 (FIG. 1) in the control disc 52.

When the control handle 4 is moved in the direction 6, the axes B of the shaft couplings 30, 30' are moved relative to the axes A of the crank arms 24, such that the slides 27 (FIG. 4) become displaced along the slideways 28 further from the axes B. The effective lever arm of the yokes 29 is increased in length because the axes C of slides 27 and stub shafts 26 are now located further from the pivot axis B of each yoke. Thus, the swinging motion of the yokes 29 produces a large swinging rocking motion of the crank arms 24. Consequently, more motion of the intermediate gears 18 is produced, and so the output speed of shaft 3 is increased.

Conversely, when the control handle 4 is moved in the direction 5, the axes B of the yokes 29 are moved relative to the axes A of the crank arms 24, such that the axes C of slides 27 and stub shafts 26 become positioned nearer to the axes B. The effective arm of the yokes 29 is decreased in length. As a result, the swinging motion of the yokes 29 produces a smaller swinging rocking motion of the cranks 24 (smaller motion of gears 18), and so the output speed of shaft 3 is correspondingly reduced.

Input shaft 1 extends most of the way through the the transmission and serves to provide a pivot mounting for the rotatable control disc 52. The forward end of the shaft is journaled in a bearing 60 seated in a central hole 62 in the front housing cup 64. This housing segment 64 has an axially extending flange 66 forming part of the housing 12. There is an elongated circumferential slot 68 (FIG. 1) in the flange 66 providing clearance for movement of the handle 4. As seen in FIG. 2, the housing fastening screws 11 screw into the flange 66.

To support the rotatable control disc 52 on the shaft 1, this control disc has an axially elongated central hub 70 (FIG. 2) with anti-friction bearings 71 and 72 mounted in the forward and rear ends, respectively, of the hub 70. The rear end of the shaft 1 is journaled in a bearing 74 in a seat 76 (FIG. 1) in the front end of the sun gear 16.

A key 80 (FIG. 2) locks the eccentric 42 and drive member 47 to the shaft 1.

Figure 6:
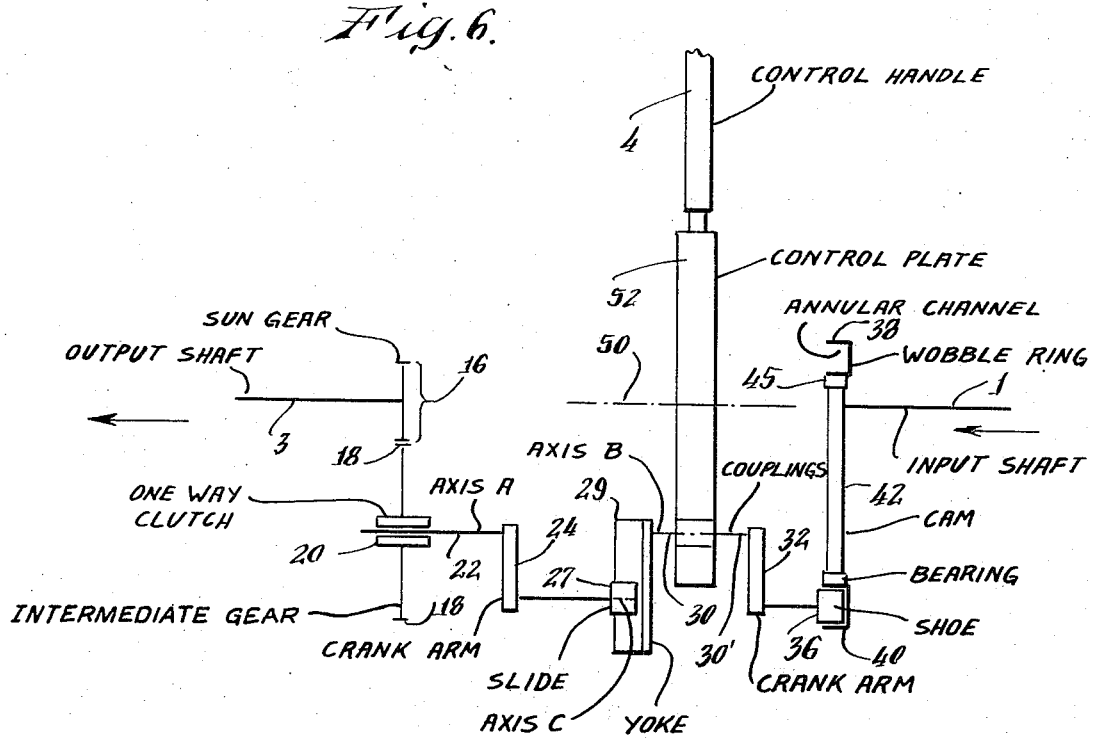
FIG. 6 is a schematic diagram for purposes of illustration showing the parts in position to provide an intermediate output speed.

FIG. 6 is a schematic diagram showing the relationship of the various parts. In this figure, the relationship is such that an intermediate output speed is being produced because the axes C of each of the slides 27 is located part way out away from the swinging axis B of the yokes 29.

Figure 7:
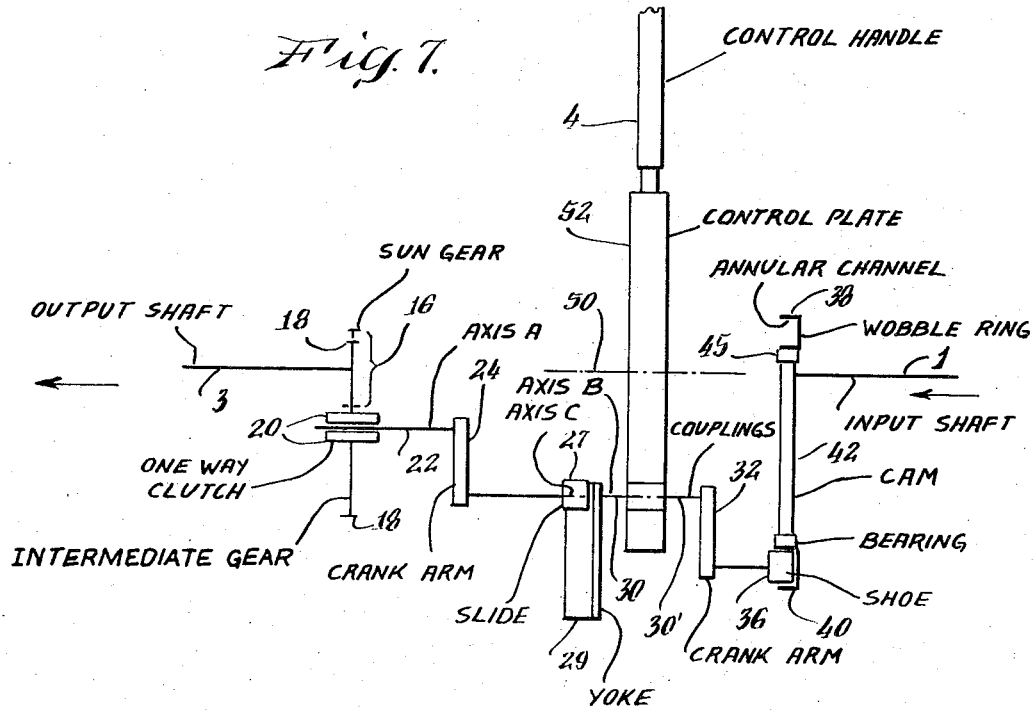
FIG. 7 is a schematic diagram similar to FIG. 6 and showing the parts in position to provide zero output speed.

FIG. 7 is a second schematic view in which the output speed has been reduced to a zero because the axis C of each of the slides 27 is directly aligned with the swinging axis B of the yokes 29. Thus, the rocking motion of the yokes 29 does not produce any motion of the crank arms 24 and, therefore, no motion of the intermediate gears 18 occurs and so no output motion is produced. FIG. 7 is a schematic view for purposes of explanation, in order to represent a three-dimensional transmission in a two-dimensional drawing, the sun gear 16 and intermediate gear 18 are shown overlapped in FIG. 7.

Advantageously, as the control arm 4 is moved, the output speed can be progressively increased without any interruption from zero up to full output speed.

It is noted that the full output speed can be greater, equal to, or lesser than the speed of the input shaft 1, depending upon the relative diameters of the intermediate gears 18, as compared with the diameter of the sun gear 16.

Figure 8:
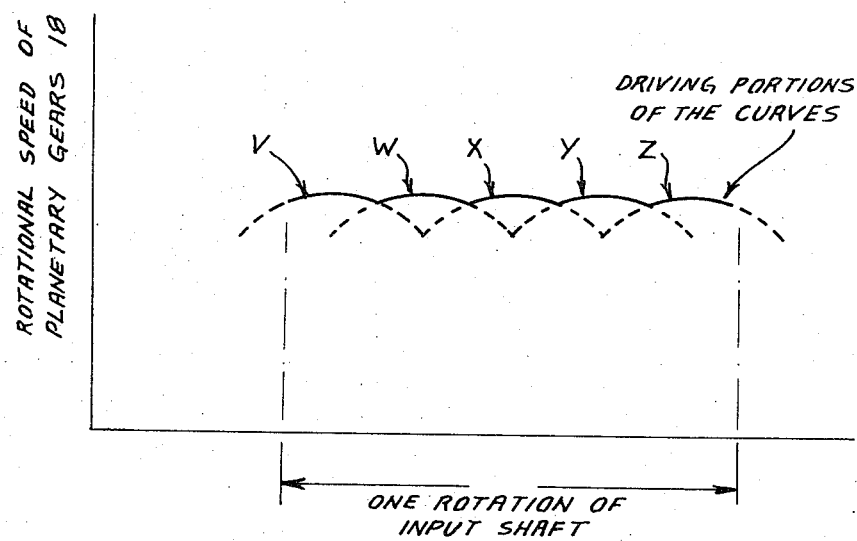
FIG. 8 is a graphical plot showing the way in which the successive intermediate gears apply driving torque to the sun gear on the central shaft at the output end of the transmission.

FIG. 8 is a schematic plot in which rotational speed is plotted against time. This plot illustrates the way in which each of the five intermediate gears 18, with its associated one-way drive clutch 20, serves to drive the output shaft during one cycle of rotation of the input shaft 1. There are five curves V, W, X, Y and Z representing the rotational motions of the five intermediate gears 18. The solid portions of each of the curves is the actual driving portion of the curve. The dotted portions of each of the curves shows that when driving shafts 22 and clutches 20, i.e., any one of them, is turning slower than the next driving clutch, than the next intermediate gear 18 takes up the load of driving the sun gear. Because of the sequence of driving curves, as shown in FIG. 8, the composite (solid) curve representing the rotation of the output shaft has slight variations in rotational speed during each rotation. These variations can be smoothed out by using a flexible coupling and a fly wheel in association with the output shaft. Also, by increasing the number of intermediate gears, the composite curve in FIG. 8 becomes smoother because more driving curves are involved in the composite. For most purposes, five intermediate gears are sufficient.

I claim:

1. A variable-speed, positive-drive transmission comprising:

a rotatable input connection adapted to have a rotary source of power connected thereto, said input connection being rotatable about the main axis of the transmission;

an output speed control member rotatably mounted in said transmission adapted to be turned to various angular positions about the main axis, said output speed control member having a plurality of openings therein spaced about the main axis;

a plurality of input crank arms each having an axis of swinging motion, said input crank arms being mounted on the input side of said speed control member with their swing axes parallel with the main axis;

eccentric drive means attached to said input connection and engaging the input crank arms for swinging the input crank arm back and forth about their respective swing axes;

a plurality of adjustable length crank arms mounted on the output side of said speed control member, respective ones of said adjustable length crank arms being connected through respective ones of said openings in the speed control member to respective ones of said input crank arms, said adjustable length crank arms having the same swing axes as said input crank arms and being swung back and forth by said input crank arms;

said adjustable length crank arms each having slideways thereon extending from said swing axis out toward the respective ends of said adjustable length crank arms;

a plurality of output crank arms mounted in said transmission adapted to swing back and forth abour rock axes, said rock axes extending parallel with the main axis;

a plurality of swivel means, respective swivel means being mounted on respective ones of said output crank arms, each of said swivel means having a swivel axis;

respective swivel means engaging the respective slideways of said adjustable length crank arms;

said swivel means being movable along said slideways of said adjustable length crank arms;

a plurality of over-running clutches, respective clutches being driven by respective output crank arms;

a driven gear engaged by a plurality of intermediate gears positioned thereabout;

respective intermediate gears being driven by said respective over-running clutches; and output connection means driven by said gears and adapted to be connected to a load to be driven, whereby turning said output speed control member to differing angular positions about said main axis changes the respective displacement between said swing axes and said swivel axes for changing the effective length of said adjustable length crank arms for varying the speed of rotation of said output connection means.

2. A variable-speed, positive-drive transmission as claimed in claim 1, in which:

said slideways on said adjustable length crank arms are provided by channels in said adjustable length crank arms; and said swivel means each includes a shoe slidably engaged in the respective channels of said adjustable length crank arms.

3. A variable-speed, positive-drive transmission as claimed in claim 1, in which:

said eccentric drive means includes circular eccentric attached to said input connection;

a bearing encircling said eccentric;

a wobble ring encircling said bearing;

said wobble ring having a circular annular channel therein; and said input crank arms having arcuate blocks rotatably mounted thereon with said arcuate blocks being engaged in said circular annular channel for movement back and forth along said annular channel as said eccentric drive means is rotated by said input connection.

4. A variable-speed, positive-drive transmission as claimed in claim 1, in which:

said input connection includes an input shaft extending into the transmission along the main axis thereof; and bearing means rotatably mounting said speed control member on said input shaft.

5. A variable-speed, positive-drive transmission comprising:
- a driven gear engaged by a plurality of intermediate gears in the transmission output;
- a rotatable speed control member which can be turned to various angular positions about the main axis of the transmission to control the speed of said intermediate and driven gears;
- a plurality of input crank arms mounted on the speed control member to swing back and forth about respective swing axes;
- a plurality of yoke crank arms also mounted on said speed control member and connected to said input crank arms to swing back and forth also about said swing axes;
- said yoke crank arms having slideways thereon extending toward and away from the swing axes;
- an input connection having eccentric drive means associated therewith engaging said input crank arms for swinging said input crank arms and said yoke crank arms back and forth about said swing axes;
- a plurality of output crank arms connected through respective over-running clutches to respective ones of said intermediate gears; and
- said output crank arms each having swivel means slidably engaging said slideways on the yoke crank arms,
- whereby changing the angular position of said rotatable speed control member slides the effective points of engagement between said yoke crank arms and said swivel means toward or away from the swing axes of said yoke crank arms,
- thereby decreasing or increasing the effective length of the yoke crank arms to thereby decrease or increase the extent of rocking motion of said output crank arms to decrease or increase the speed of said intermediate and driven gears,
- by virtue of which the output speed can be continuously varied over a range.

6. A variable-speed, positive-drive transmission as claimed in claim 5, in which:
- said slideways extend along said yoke crank arms to their respective swing axes,
- whereby the speed control member can be turned to an angular position to bring the swing axes of the yoke crank arms into alignment with the axes of the respective swivel means,
- thereby to reduce the rocking motion of said output crank arms to produce zero output speed of said intermediate and sun gears.

7. A variable-speed, positive-drive transmission as claimed in claim 5, in which:
- said slideways on said yoke crank arms are provided by channels in said yoke crank arms,
- said swivel means include a shoe pivotally mounted on each of said output crank arms, and
- each shoe is slidably engaged in the channel of a respective yoke crank arm.

8. A variable-speed, positive-drive transmission as claimed in claim 7, in which:
- the channel in each of said yoke crank arms extends radially from the swing axis to the end of the respective yoke crank arm.

9. A variable-speed, positive-drive transmission as claimed in claim 5, in which:
- said eccentric drive means includes an eccentric driven by the input connection,
- a bearing encircling said eccentric, and a wobble ring encircling said bearing for swinging said input crank arms and said yoke crank arms back and forth about said swing axes.

10. A variable-speed, positive-drive transmission as claimed in claim 9, in which:
- said wobble ring includes an annular channel therein,
- a plurality of arcuate shoes are slidably engaged in said annular channel, and
- respective ones of said slide shoes are pivotally connected to respective ones of said input crank arms.

* * * * *